United States Patent [19]

Dohi

[11] Patent Number: 4,730,969

[45] Date of Patent: Mar. 15, 1988

[54] SELF-DRILLING SCREW

[75] Inventor: Kameo Dohi, Shiga, Japan

[73] Assignee: Nisco Inc., Shiga, Japan

[21] Appl. No.: 828,645

[22] Filed: Feb. 12, 1986

[30] Foreign Application Priority Data

Feb. 12, 1985 [JP] Japan .................................. 60-25904
Mar. 25, 1985 [JP] Japan .................................. 60-60212

[51] Int. Cl.⁴ .......................................... F16B 25/00
[52] U.S. Cl. .................................... 411/387; 408/211
[58] Field of Search ................ 411/386, 387; 408/211, 408/223, 224, 227, 229, 230

[56] References Cited

U.S. PATENT DOCUMENTS

| | | | |
|---|---|---|---|
| 2,587,980 | 3/1952 | Doepker | 408/211 |
| 3,395,603 | 8/1968 | Skierski | |
| 3,564,947 | 2/1971 | Maier | 408/211 |
| 3,710,676 | 1/1973 | Ringland | |
| 4,125,050 | 11/1978 | Schwartzman et al. | 411/387 |
| 4,407,620 | 10/1983 | Shinjo | 411/387 |
| 4,568,229 | 2/1986 | Hulsey | 411/387 |
| 4,586,862 | 5/1986 | Yamasaki | 411/387 |
| 4,605,347 | 8/1986 | Jodock et al. | 408/224 |

Primary Examiner—Neill Wilson
Attorney, Agent, or Firm—Birch, Stewart, Kolasch, & Birch

[57] ABSTRACT

A self-drilling screw comprising a threaded shank having a head at one end and a forged drill bit at the other end, the drill bit including a pair of oppositely disposed intrusion faces and a pair of oppositely disposed axial flutes, a chisel edge formed at a lower extremity of the drill bit and divided into two parts by a downwardly projecting apex formed on the chisel edge, the two parts extending from the apex in the opposite directions and each being slightly inclined to provide an inclination angle formed between itself and a workpiece surface, the inclination angle being within the range from 5° to 20°, the drill bit further including a pair of oppositely disposed vertical flat rake faces which substantially adjoin each other at an adjoining point disposed on the chisel edge and which extend upwardly from the chisel edge in a vertical plane substantially containing the chisel edge and a longitudinal axis of the screw.

31 Claims, 18 Drawing Figures

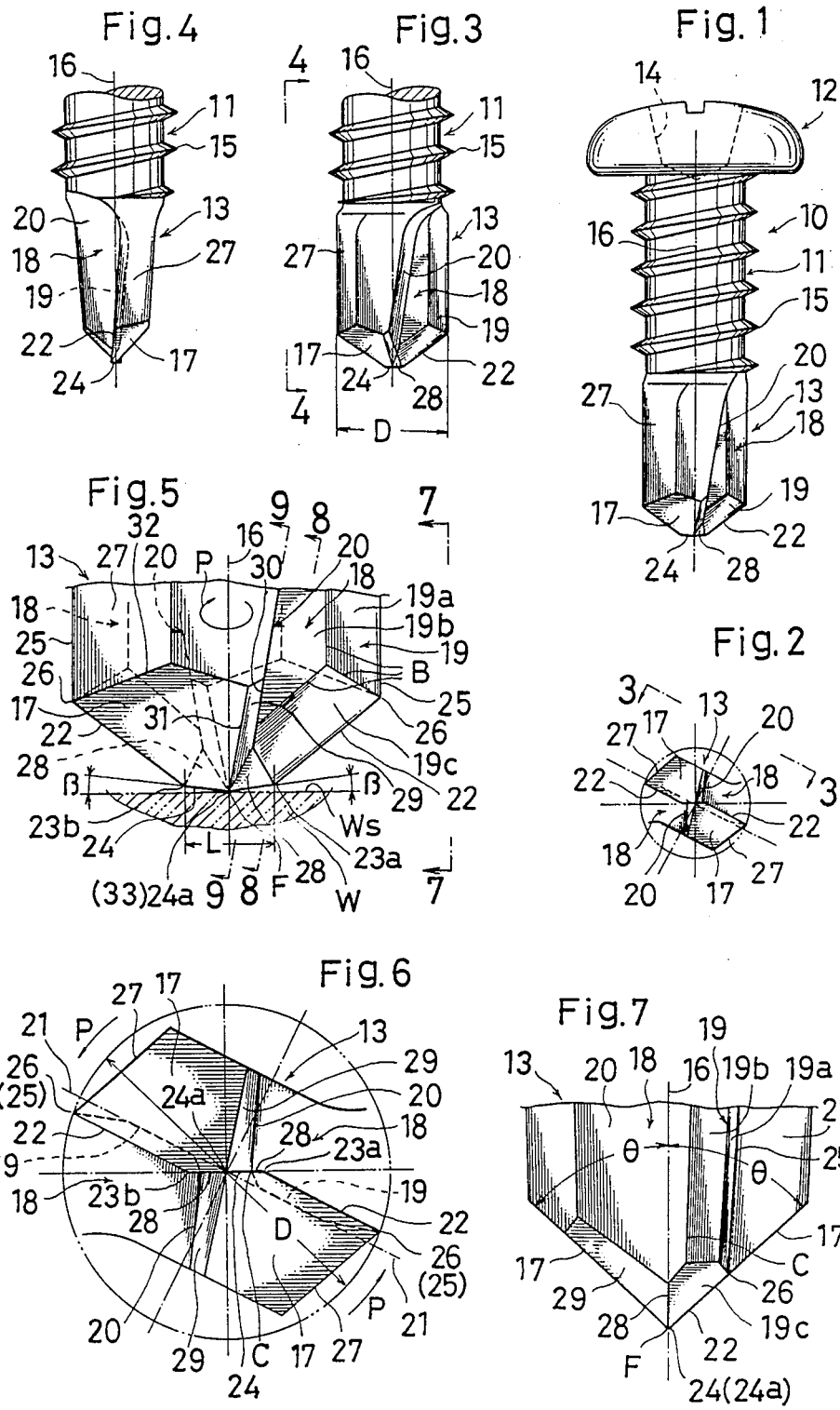

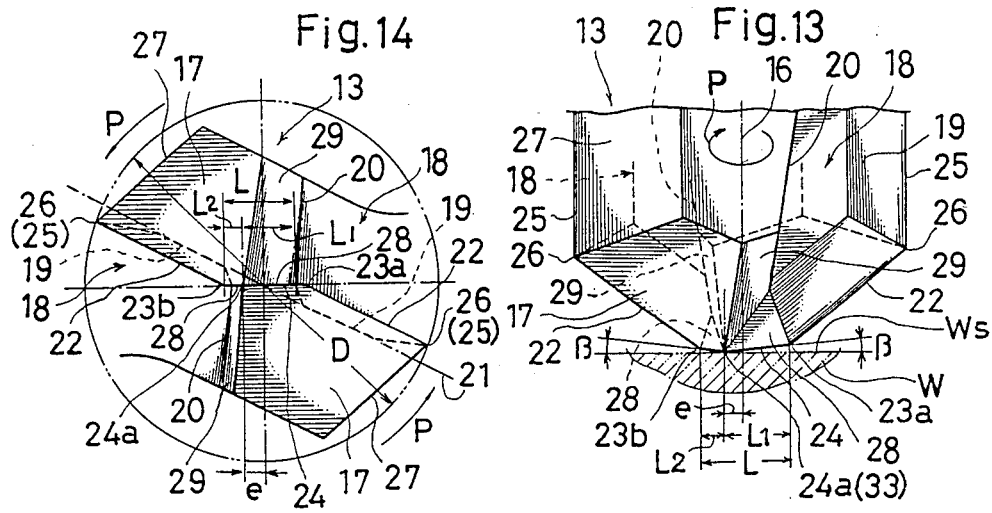
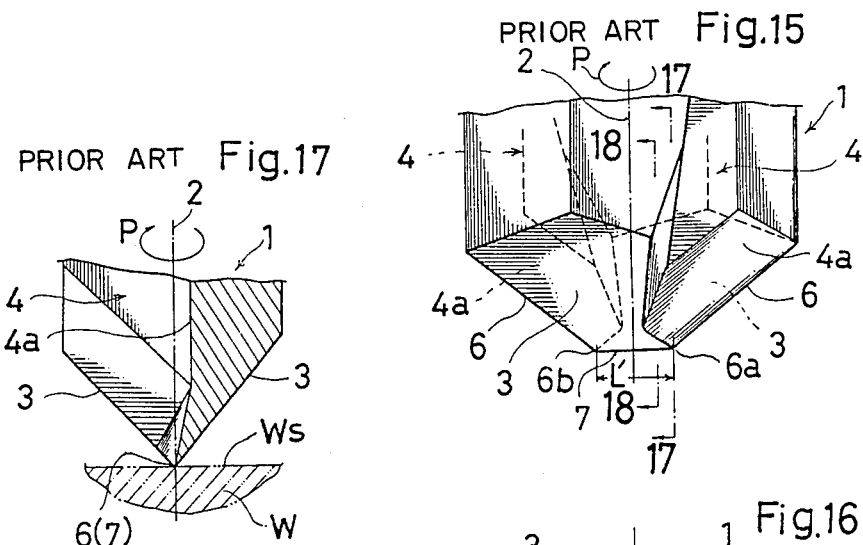
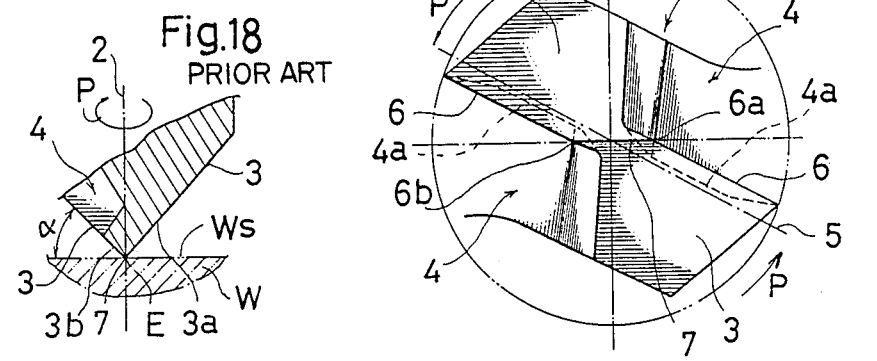

SELF-DRILLING SCREW

BACKGROUND OF THE INVENTION

1. Field of the Invention:

This invention relates to a self-drilling screw having an integral drill bit formed at a lower end of a threaded shank to drill an entry hole in a workpiece, and more particularly to improvements in the self-drilling screw of the type that has the drill bit shaped through cold forging such as pinch pointing.

2. Description of the Prior Art:

Recently, a drill bit of a self-drilling screw is, in many instances, formed not by machining but by cold forging (typically by pinch pointing) because the latter is more advantageous in mass production.

In general, the self-drilling screws with a forged drill bit can be roughly classified into two types. In the first type, the terminal end of the drill bit is forged into a pin point shape, as disclosed for example in U.S. Pat. No. 3,710,676 to Ringland. In the second type, that of the drill bit is forged into a chisel edge shape, as disclosed for example in U.S. Pat. Nos. 3,395,603 to E. J. Skierski and 4,407,620 to Shinjo. Each of the two types has its particular advantages and disadvantages.

The pin pointed drill bit is generally advantageous in that it easily permits an attempt to drill an entry hole correctly at an intended spot of application on a blank workpiece because its pin pointed drill end is in point-contact with the workpiece surface at the initial phase of screwing operation, whereby the drill end is easily embedded in the workpiece so as to prevent an undesirable lateral moving of the screw from the intended spot of application on the workpiece, hereinafter referred to as "wandering" or "wandering phenomenon". However, this type drill bit is generally disadvantageous in that its pin pointed drill end damages easily to lose its expected function, and, as is well known in the art, an initial intrusion of the drill end into a workpiece is slower in speed than that of the chisel edged drill bit.

In contrast thereto, the chisel edged drill bit is generally advantageous in that its drill end is less damageable than the pin pointed drill end and, in addition, the initial intrusion of the drill end into a workpiece is more rapidly carried out than that of the pin pointed drill bit. However, this type is generally disadvantageous in that the chisel edged configuration causes more or less the undesirable wandering of the screw on the workpiece surface when the screw is forced thereagainst and driven into rotation by a power driver, because its drill end is not pin pointed for easy penetration but chisel edged so as to provide a line-contact with the workpiece surface at the initial phase of the operation.

For ease of further discussion of particular disadvantages resulting from the prior art configuration of the chisel edged drill bit, description is now made with reference to FIGS. 15 to 18 of the accompanying drawings, in which the drill bit 1 is illustrated as having a pair of inclined flat intrusion faces 3 disposed symmetrically with respect to an axis 2 of the screw, that is an axis of rotation of the screw. The flat intrusion faces 3 terminate to share a common lower extremity E as shown in FIG. 18. In other words, the flat intrusion faces 3 meet each other along a line 7 (FIG. 16) of intersection at the lower extremity E to form a rectilinear chisel edge 7 extending transversely of the screw axis 2.

The drill bit 1 includes a pair of axial flutes 4 located symmetrically with respect to the screw axis 2. Each flute 4 is disposed adjacent to each of the intrusion faces 3 and extends upwardly from the lower extremity E. Each flute 4 has its one surface 4a extending to meet one of the intrusion faces 3 along a line 6 of intersection to form an oblique cutting edge 6 which is inclined with respect to the axis 2. A pair of the cutting edges 6 thus formed are oppositely disposed with respect to a vertical imaginary reference plane 5 which contains the axis 2, as shown in FIG. 16. One of the cutting edges 6 terminates at one end 6a of the chisel edge 7 while the other thereof at the other end 6b of the chisel edge 7. Thus, a length of the chisel edge 7 is defined by a distance L' between the opposite terminal points 6a, 6b of the pair of cutting edges 6, as seen in FIG. 15. One of the flutes 4 starts at the aforesaid terminal point 6a while the other thereof at the other terminal point 6b, as best shown in FIG. 15.

Since the chisel edge 7 is formed at the lower extremity E along the line of intersection of the two flat intrusion faces 3, a longitudinal section of a lower end portion of the drill bit 1 taken along any imaginary plane (for example a plane containing the line 18—18 in FIG. 15) that is transverse to the chisel edge line 7, is always of such a triangular configuration whose one side $3a$ is located on one side of the axis 2 while the other side $3b$ thereof on the opposite side of the axis 2. Naturally, an angle $\alpha$ defined by the side $3b$ and a workpiece surface Ws is less than 90°, as shown in FIG. 18. This means that the side $3b$ does not serve as a rake face but prevents introduction of produced chips into the flute 4, resulting in that the drilling capability is inferior.

Further, the prior art drill bit configuration does not eliminate the above discussed general disadvantage that the screw is easy to wander on a surface Ws of a workpiece W because the chisel edge 7 is in line-contact with the workpiece surface Ws at the initial phase of screwing operation.

SUMMARY OF THE INVENTION

It is, therefore, an object of the invention to provide an improved self-drilling screw having a forged drill bit which facilitates an excellent drilling capability.

Another object of the invention is to provide an improved self-drilling screw having a forged drill bit which partakes of the above discussed general advantages in both of the pin pointed and the chisel edged configurations.

A further object of the invention is to provide an improved self-drilling screw with a forged drill bit so shaped as to minimize the above discussed wandering phenomenon which occurs at the initial phase of screwing operation.

Still a further object of the invention is to provide an improved self-drilling screw with a forged drill bit so shaped as to permit a rapid intrusion of the drill end into a workpiece at the initial phase of the operation.

Other objects, features and advantages of the invention will become apparent from the following detailed description.

According to the invention, there is provided a self-drilling screw to be screwed into a workpiece, which comprises: a threaded shank having a head at one end and a forged drill bit at the other end, the drill bit including a pair of oppositely disposed, inclined intrusion faces and a pair of oppositely disposed, vertically extending flutes, a chisel edge formed at a lower extremity of the drill bit and divided into two parts by a downwardly projecting apex formed on the chisel edge, the two parts extending from the apex in the opposite directions and each being slightly inclined to provide an inclination angle formed between itself and a surface of the workpiece, the inclination angle being within the range from 5° to 20°, the drill bit having a pair of oppositely disposed vertical flat rake faces which substantially adjoin each other at an adjoining point disposed on the chisel edge and which extend upwardly from the chisel edge in a vertical plane substantially containing the chisel edge and a longitudinal axis of the screw.

BRIEF DESCRIPTION OF THE DRAWINGS

In the accompanying drawings:

FIG. 1 is a front elevation illustrating a selfdrilling screw according to the invention;

FIG. 2 is a bottom plan view of FIG. 1;

FIG. 3 is a side elevation viewed along the line 3—3 in FIG. 2;

FIG. 4 is a side elevation viewed along the line 4—4 in FIG. 3;

FIG. 5 is a fragmentary enlarged view illustrating a lower end portion of the screw of FIG. 1;

FIG. 6 is a bottom plan view in FIG. 5;

FIG. 7 is a side elevation viewed along the line 7—7 in FIG. 5;

FIG. 13 is also a similar view to FIG. 5, but showing a fourth embodiment of the invention;

FIG. 14 is a bottom plan view of FIG. 13; and

FIGS. 15 to 18 illustrate an example of prior art screw, wherein FIG. 15 is an enlarged fragmentary front elevation of the prior art screw; FIG. 16 is a bottom plan view of FIG. 16; FIG. 17 is a fragmentary longitudinal section taken along the line 17—17 in FIG. 15; and FIG. 18 is a similar view to FIG. 17 but taken along the line 18—18 in FIG. 15.

Figure 8:
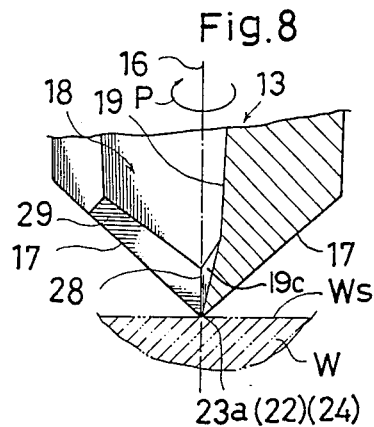
FIG. 8 is a fragmentary longitudinal section taken along the line 8—8 in FIG. 5.

DESCRIPTION OF THE PREFERRED EMBODIMENTS:

Referring now to the drawings, in particular to FIGS. 1 to 9 first, a self-drilling screw 10 according to the invention includes an elongated shank 11 which has a known head 12 integral with its top end and a forged drill bit 13 integral with its lower end. The head 12 is formed with a suitable slot or recess 14 for accommodating and cooperating with a driving tool, for example a power screwdriver, for turning the screw 10, conventionally. The head 12 may take various known forms. The shank 11 has conventional threads 15 roll formed on the surface thereof.

The forged drill bit 13 has its maximum diameter D greater than a root diameter of the threads 15 but smaller than a crest diameter thereof so as to produce a threaded hole in a workpiece which permits a screw to be well anchored therein.

The drill bit 13 is pinched or cold forged between a pair of oppositely disposed complementary die elements (not shown) so as to provide a specific configuration featuring the invention as will be described in greater detail hereinafter. It is a usual practice that such cold forging is performed after a screw blank is headed but before the threads 15 are roll formed on the shank 11.

The drill bit 13 thus formed includes a pair of opposed flat intrusion faces 17 disposed symmetrically with respect to a longitudinal axis or center line 16 of the screw 10, that is an axis of rotation of the screw. The intrusion faces 17 are symmetrically inclined with respect to the screw axis 16 by an appropriate angle $\theta$ and terminate to share a common lower extremity F of the drill bit 13, as best shown in FIG. 7. In other words, the two flat faces 17 meet each other at the lower extremity F along a line 24 of intersection to form a chisel edge 24 extending therealong.

The drill bit 13 includes a pair of substantially axial flutes 18 disposed symmetrically with respect to the screw axis 16. Each flute 18 is disposed adjacent to each of the two intrusion faces 17 and extends upwardly from the lower extemity F. Each flute 18 has a first surface 19 serving as a cutting surface and a second surface 20 serving as a drag surface. In the illustrated embodiments, the first surface 19 is subdivided by lines B into three flat surfaces 19a, 19b, 19c while the second surface 20 includes an inclined extension 29 which extends from a line 30 to meet one of the intrusion faces 17 along a line 31, as seen in FIG. 5. However, it is to be noted that provision of such divisional surfaces 19a, 19b, 19c and/or the extension 29 is merely a matter of design choice and does not feature the invention. For instance, the first surface 19 may be in the form of a smoothly continuous single flat or slightly concave wall. Likewise, the second surface 20 may also be in the form of a smoothly continuous, slightly convex wall. Alternatively, the inclined extension 29 may be omitted if the second surface 20 is in the form of a single flat wall starting from the line 31 and extending inwardly to meet the first surface 19.

The first surface 19 meets the second surface 20 at a boundary corner C which extends substantially vertically, as best shown in FIG. 7.

Each first flute surface 19 meets one of the flat intrusion faces 17 along a line 22 of intersection to form a cutting edge 22 extending therealong and inclined with respect to the screw axis 16. A pair of the cutting edges 22 thus formed are oppositely located with respect to a vertical imaginary reference plane 21 which contains the screw axis 16. As viewed from bottom, the pair of cutting edges 22 extend substantially parallel relative to the reference plane 21, as shown in FIG. 6.

One of the cutting edges 22 terminates at one end 23a of the chisel edge 24 while the other thereof at the other end 23b of the chisel edge 24. Thus, a length of the chisel edge 24 is substantially defined by a distance L between the opposite terminal points 23a, 23b, when viewed from the bottom, as also shown in FIG. 5. One of the flutes 18 starts at the aforesaid terminal point 23a while the other thereof at the other terminal points 23b, as best shown in FIG. 5.

The chisel edge 24 has a downwardly projecting apex 24a on the screw axis 16 so that the edge 24 is divided into two equal parts at which are slightly inclined and extend in the opposite directions from the apex 24a to terminate at the point 23a, 23b, respectively. An angle $\beta$ formed between each of the aforesaid two parts and a workpiece surface Ws is so predetermined as to be in the range of 5° to 20°. A pair of flat vertical rake faces 28 adjoin each other at a point 33 which is coincident with the apex 24a.

Each inclined cutting edge 22 extends upwardly to terminate in its upper end 26 from which a substantially vertical side cutting edge 25 extends upwardly. A pair of the side cutting edges 25 extend in parallelism and a distance therebetween corresponds to the maximum diameter D of the drill bit 13, thereby to determine the diameter of the hole (not shown) to be drilled in a workpiece W.

Disposed immediately adjacent to each side cutting edge 25 is disposed a body clearance 27 which may preferably be a vertical flat surface extending upwardly from a line 32 of intersection with one of the intrusion faces 17.

The pair of flat vertical rake faces 28 is formed, one on both sides of the screw axis 16. Each rake face 28 is disposed immediately adjacent to and upstands from the chisel edge 24 so as to be substantially on a vertical plane containing the screw axis 16. Each rake face 28 joins each of the first and the second flute surfaces 19, 20 which line on the different planes deviant from the rake faces 28. In the illustrated embodiments, each rake face 28 joins along its one side to the wall 19c of the first surface 19 and along its another side to the inclined extension 29 of the second surface 20.

The flat vertical rake faces 28 can be easily formed by cold forging at the same time together with the intrusion faces 17, the flute 18, the body clearances 27 and other portions of the drill bit 13.

Figure 9:
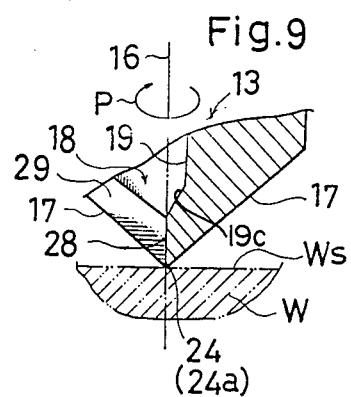
FIG. 9 is a similar view to FIG. 8 but taken along the line 9—9 in FIG. 5.

In operation, when the screw 10 is forced against a blank workpiece W and turned in the direction of arrow P by a suitable driving tool, each of the pair of vertical flat rake faces 28 is directed toward the direction of rotation of the screw and positioned so as to be substantially perpendicular to the workpiece surface Ws, thereby to permit the produced chips (not shown) to flow easily into the flute 18, as will be easily understood from FIGS. 8 and 9. This results in an acceleration in speed of the drill end intrusion into the workpiece at the initial phase of the screwing operation and a good drilling capability.

The projecting apex 24a on the screw axis 16 serves as a pin pointed tip. Thus, the apex 24a is relatively easily embedded in the workpiece W so as to prevent the screw from wandering at the initial phase of the operation. This apex 24a is not so easily damageable because the inclination angle is limited to the range of 5° to 20°.

As a result of experiments, it has been proved that the inclination angle $\beta$ greater than 20° provides an excessively sharp apex 24a which damages easily and that the inclination angle smaller than 5° provides a dull apex 24a which causes occurrence of the undesirable wandering phenomenon.

It has also been proved by the experiments that the good drilling capability of the screw according to the invention results from the mutual cooperation of the rake faces 28 and the specific chisel edge 24 having the projecting apex 24a whose inclination angle $\beta$ is in the range of 5° to 20°. Comparison tests have revealed that, in the case where the the drill end is not provided with the rake faces 28, the intial intrusion of the drill end into the workpiece is slower than that of the prior art screws.

Further, it has been found that the overall length L of the chisel edge 24 may preferably be in the range of 10 to 30% of a crest diameter of the threads 15 and that the chisel edge 24 should not be strictly limited to the illustrated example having a pair of rectilinear radial edges because the edge 24 may be slightly curved to provide the substantially same good drilling capability. In the case where the chisel edge 27 is curved, the inclination angle $\beta$ is defined by the workpiece surface Ws and an imaginary straight line extending from the apex 24a to the point 23a or 23b where the the imaginary straight line intersects with the curved edge 24.

Figure 10:
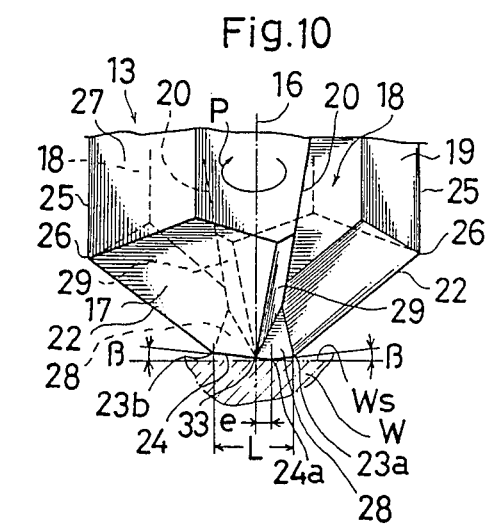
FIG. 10 is a similar view to FIG. 5, but showing a second embodiment of the invention.
Figure 11:
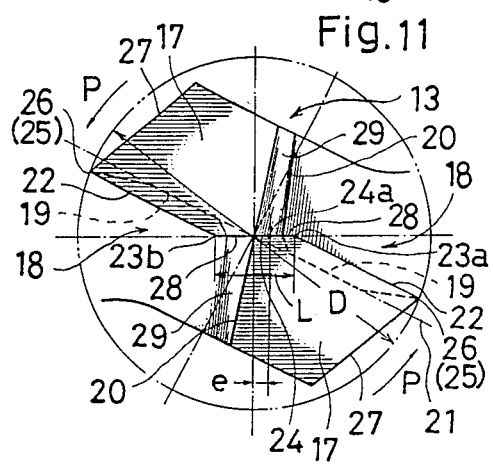
FIG. 11 is a bottom plan view of FIG. 10.

FIGS. 10 and 11 illustrate a second embodiment of the drill bit configuration according to the invention, wherein the chisel edge 24 is bisected by the screw axis 16 and the adjoining point 33 interposed between the pair of rake faces 28 is on the screw axis 16, so that a lateral width of each of the rake faces 28 is defined by one half of the distance L between the opposite terminal points 23a, 23b. However, the apex 24 is offset from the screw axis 16 by a slight distance (e) which corresponds to 5/100–20/100 of the maximum diameter D of the drill bit 13. Thus, one part of the chisel edge 24 is longer on one side of the apex 24a than the other part on the other side of the apex 24a. With this specific arrangement, the initial intrusion of the drill end into the workpiece is increased in speed because the offset apex moves around the axis 16 along a circle with a radius (e) thereby to accelerate the initial intrusion speed of the drill end.

It has been found that the distance (e) smaller than 5/100 of the maximum drill bit diameter D does not provide the acceleration of the intrusion speed and that the distance (e) greater than 20/100 of the diameter D brings about occurrence of the undesirable wandering phenomenon.

Figure 12:
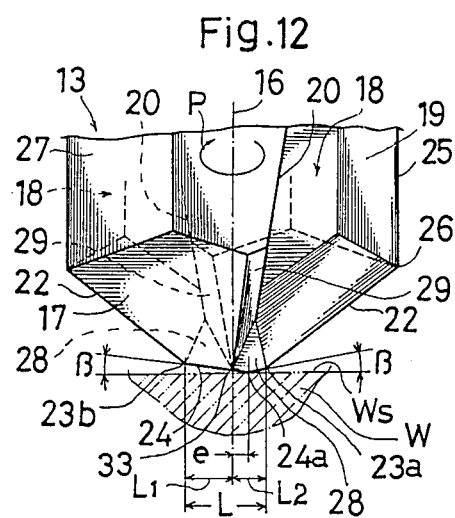
FIG. 12 is a similar view of FIG. 5, but showing a third embodiment of the invention.

FIG. 12 illustrates the third embodiment of the invention, wherein one part of the chisel edge 24 is longer on one side of the apex 24a than the other part on the other side of the apex 24a and the adjoining point 33 is on the axis 16. However, one of the rake faces 28 has a longer lateral width defined by a distance L1 between the adjoining point 33 and the terminal point 23b while the other of the rake faces 28 has a shorter lateral width defined by a distance L2 between the points 33 and 23a. The apex 24a is offset from the axis 16 by the distance (e) and disposed on the shorter of the two rake faces 28, in which the distance (e) is defined hereinabove.

FIGS. 13 and 14 illustrate the fourth embodiment of the invention, wherein one part of the chisel edge 24 is shorter on one side of the apex 24a than the other part on the other side of the apex 24a and the adjoining point 33 is on the apex 24a. Also, in this embodiment one of the rake faces 28 has a shorter lateral width L2 and the other thereof has a longer lateral width L1. The apex 24a is also offset from the axis 16 by the slight distance (e) defined hereinbefore.

The specific drill bit configurations of the third and the fourth embodiments impart an increased mechanical strength to the apex 24a because the apex is disposed on the shorter of the two rake faces 28.

It has been proved by experiments that an appropriate value of the inclination angle $\beta$ is also in the range of 5° to 20° with all of the above described second to fourth embodiments.

The invention being thus described, it will be obvious that the same may be varied in many ways. Such variations are not be be regarded as a departure from the spirit and scope of the invention, and all such modifications as would be obvious to those skilled in the art are intended to be included within the scope of the appended claims.

I claim:

1. A self-drilling screw to be screwed into a workpiece, said screw comprising:
   a threaded shank having a head at one end and a drill bit at the other end;
   said drill bit including a pair of oppositely disposed inclined intrusion faces and a pair of oppositely disposed vertically extending flutes;
   a chisel edge formed at a lower extremity of said drill bit and divided into two chisel edge portions by a downwardly projecting apex formed on said chisel edge, said two chisel edge portions extending from said apex in opposite directions with each of said chisel edge portions being slightly inclined at an inclination angle of from 5° to 20° relative to a plane defined as being perpendicular to a longitudinal axis of said drill bit and containing said apex; and
   a pair of oppositely disposed and substantially vertically extending rake faces, said rake faces are substantially flat and substantially adjoin each other at an adjoining point disposed on said chisel edge and extend upwardly from said chisel edge in a vertical plane substantially containing said chisel edge and a longitudinal axis of said screw,
   wherein said apex is offset from the central longitudinal axis of the screw by a distance corresponding to 5/100–20/100 of a maximum diameter of said drill bit.

2. A self-drilling screw to be screwed into a workpiece, said screw comprising:
   a threaded shank having a head at one end and a drill bit at the other end;
   said drill bit including a pair of oppositely disposed inclined intrusion faces and a pair of oppositely disposed vertically extending flutes;
   a chisel edge formed at a lower extremity of said drill bit and divided into two chisel edge portions by a downwardly projecting apex formed on said chisel edge, said two chisel edge portions extending from said apex in opposite directions with each of said chisel edge portions being slightly inclined at an inclination angle of from 5° to 20° relative to a plane defined as being perpendicular to a longitudinal axis of said drill bit and containing said apex; and
   a pair of oppositely disposed and substantially vertically extending rake faces, said rake faces are substantially flat and substantially adjoin each other at an adjoining point disposed on said chisel edge and extend upwardly from said chisel edge in a vertical plane substantially containing said chisel edge and a longitudinal axis of said screw,
   wherein one of said two chisel edge portions is longer than the other.

3. A self-drilling screw to be screwed into a workpiece, said screw comprising:
   a threaded shank having a head at one end and a drill bit at the other end;
   said drill bit including a pair of oppositely disposed, inclined intrusion faces and a pair of oppositely disposed, vertically extending flutes;
   a chisel edge formed at a lower extremity of said drill bit and divided into two chisel edge portions by a downwardly projecting apex formed on said chisel edge, said two chisel edge portions extending from said apex in opposite directions, with each of said chisel edge portions being slightly inclined at an inclination angle of from 5° to 20° relative to a plane defined as being perpendicular to a longitudinal axis of said drill bit and containing said apex; and
   a pair of oppositely disposed and substantially vertically extending rake faces, said rake faces are substantially flat and substantially adjoin each other at an adjoining point disposed on said chisel edge and extend upwardly from said chisel edge in a vertical plane substantially containing said chisel edge and a longitudinal axis of said screw,
   wherein one of said pair of rake faces is smaller in lateral length than the other, and said apex is offset from the central longitudinal axis of the screw.

4. A self-drilling screw to be screwed into a workpiece, said self-drilling screw comprising:
   a threaded shank portion having a first end and a second end;
   a head portion connected to said first end of said threaded shank portion, said head portion having engagement means for driving the self-drilling screw with a driver;
   a drill portion comprising:
   a chisel edge formed at a lower extremity of said drill portion, said chisel edge having an apex from which extends a first chisel edge portion and a second chisel edge portion,
   said first and second chisel edge portions being slightly inclined relative to a plane defined as being normal to a longitudinal axis of the self-drilling screw and containing said apex;
   a pair of oppositely disposed inclined intrusion faces each extending from one of said first and second chisel edge portions;
   a pair of oppositely disposed inclined cutting edges each extending from one of said first and second chisel edge portions;
   a pair of oppositely disposed vertically extending flutes, each of said pair of flutes being partially defined by a recessed cutting surface having an inclined cutting surface portion positioned at a substantial rake angle with respect to the longitudinal axis of said screw;
   a pair of oppositely disposed and substantially vertically extending rake faces, each said rake face is substantially planar and extends from one of said first and second chisel edge portions to one of said inclined cutting surface portions of each said pair of flutes for providing walls, of said drill portion on which said pair of rake faces are disposed, with a substantial thickness and said first and second chisel edge portions with a substantial angle for preventing mechanical damage to said first and second chisel edge portions and to faciliate chip removal during a drilling operation, each said recessed cutting surface extending from a corresponding one of said pair of inclined cutting edges into an upper portion of a corresponding flute for facilitating and directing the removal of chips forming at said chisel edge and said inclined cutting edges into said flutes.

5. The self-drilling screw according to claim 4, wherein said apex is on a central longitudinal axis of the self-drilling screw.

6. The self-drilling screw according to claim 4, wherein said apex is off center from a central longitudinal axis of the self-drilling screw.

7. The self-drilling screw according to claim 4, wherein said apex is off center from a central longitudinal axis of the screw by a distance equal to 5/100 to 20/100 of a maximum diameter of said drill portion.

8. The self-drilling screw according to claim 4, wherein said first and second chisel edge portions are equal in length.

9. The self-drilling screw according to claim 4, wherein one of said first and second chisel edge portions is longer than the other.

10. The self-drilling screw according to claim 9, wherein each of said inclined cutting surface portions extends from one of said pair of inclined cutting edges to a substantially vertically extending cutting surface portion of each of said pair of flutes.

11. The self-drilling screw according to claim 10, wherein one of said pair of rake faces is smaller in lateral length than the other.

12. The self-drilling screw according to claim 10, wherein said chisel edge is curved.

13. The self-drilling screw according to claim 10, wherein said first and second chisel edge portions have an inclination angle in the range of 5° to 20° relative to said plane.

14. A self-drilling screw to be screwed into a workpiece, said screw comprising:
a threaded shank having a head at one end and a forged drill bit at the other end,
said drill bit including a pair of oppositely disposed inclined intrusion faces, a pair of oppositely disposed vertically extending flutes, and a pair of inclined cutting edges;
a chisel edge formed at a lower extremity of said drill bit and divided into two chisel edge portions by a downwardly projecting apex formed on said chisel edge, said two chisel edge portions extending from said apex in opposite directions with each of said chisel edge portions being slightly inclined at an inclination angle of from 5° to 20° relative to a plane defined as being perpendicular to a longitudinal axis of said drill bit and containing said apex; and
a pair of oppositely disposed and substantially vertically extending rake faces, said rake faces are substantially flat and substantially adjoin each other at an adjoining point disposed on said chisel edge and extend upwardly, from said chisel edge to said pair of flutes, in a vertical plane substantially containing said chisel edge and a longitudinal axis of said screw,
each of said flutes being partially defined by a recessed cutting surface having an inclined cutting surface portion positioned at a substantial rake angle with respect to the longitudinal axis of said screw and adjoining a corresponding one of said vertical rake faces, said recessed cutting surface extending from a corresponding one of said pair of inclined cutting edges into an upper portion of a corresponding flute for facilitating and directing the removal of chips forming at said chisel edge and said inclined cutting edges into said flutes.

15. The screw as defined in claim 1, wherein said apex is on said axis of the screw.

16. The screw as defined in claim 1, wherein said apex is on said adjoining point.

17. The screw as defined in claim 1, wherein said apex is offset from said axis of the screw by a distance corresponding to 5/100 to 20/100 of a maximum diameter of said drill bit.

18. The screw as defined in claim 1, wherein said two chisel edge portions of the chisel edge are equal in length.

19. The screw as defined in claim 1, wherein one of said two chisel edge portions of the chisel edge is longer than the other.

20. The screw as defined in claim 1, wherein
one of said pair of rake faces is smaller in lateral length than the other, and
said apex is disposed on said one of said pair of rake faces.

21. The screw as defined in claim 1, wherein said chisel edge is curved.

22. A boring tool comprising:
a drill portion comprising:
a chisel edge formed at a lower extremity of said drill portion, said chisel edge having an apex from which extends a first chisel edge portion and a second chisel edge portion,
said first chisel edge portion and said second chisel edge portions being slightly inclined relative to a plane defined as being perpendicular to a longitudinal axis of the drill portion and containing said apex;
a pair of oppositely disposed inclined intrusion faces each extending from one of said first and second chisel edge portions;
a pair of oppositely disposed inclined cutting edges each extending from one to said first and second chisel edge portions;
a pair of oppositely disposed flutes exending along the length of said drill portion, each of said pair of flutes being partially defined by a recessed cutting surface having an inclined cutting surface portion positioned at a substantial rake angle with respect to the longitudinal axis of said screw;
a pair of oppositely disposed and substantially vertically extending rake faces, each said rake face is substantially planar and extends from one of said first and second chisel edge portions to one of said inclined cutting surface portions of each said pair of flutes for providing walls, of said drill portion on which said pair of rake faces are disposed, with a substantial thickness and said first and second chisel edge portions with a substantial angle for preventing mechanical damage to said first and second chisel edge portions and to facilitate chip removal during a drilling operation, each said recessed cutting surface extending from a corresponding one of said pair of inclined cutting edges into an upper portion of a corresponding flute for facilitating and directing the removal of chips forming at said chisel edge and said inclined cutting edges into said flutes.

23. The boring tool according to claim 22, wherein each of said inclined cutting surface portions extends from one of said pair of inclined cutting edges to a substantially vetically extending cutting surface portion of each of said pair of flutes.

24. The boring tool according to claim 23, wherein said apex is located on a central longitudinal axis of the drill portion.

25. The boring tool according to claim 22, wherein said apex is off center from a central longitudinal axis of the drill portion.

26. The boring tool according to claim 22, wherein said apex is off center from a central longitudinal axis of the screw by a distance equal to 5/100 to 20/100 of a maximum diameter of said drill portion.

27. The boring tool according to claim 23, wherein said first and second chisel edge portions are equal in length.

28. The boring tool according to claim 22, wherein one of said first and second chisel edge portions is longer than the other.

29. The boring tool according to claim 22, wherein one of said pair of rake faces is smaller in lateral length than the other.

30. The boring tool according to claim 23, wherein said chisel edge is curved.

31. The boring tool according to claim 23, wherein said first and second chisel edge portions have an inclination angle in the range of 5° to 20° relative to said plane.

* * * * *